US005502013A

United States Patent [19]
James

[11] Patent Number: 5,502,013
[45] Date of Patent: Mar. 26, 1996

[54] METHOD FOR MAKING A SMOOTH-SURFACE CERAMIC

[76] Inventor: Gilbert James, P.O. Box 1546, Wakefield, Mass. 01880

[21] Appl. No.: 250,562

[22] Filed: May 27, 1994

Related U.S. Application Data

[63] Continuation of Ser. No. 696,570, May 8, 1991, Pat. No. 5,316,989.

[51] Int. Cl.$^6$ .......................... C04B 35/08; C04B 35/10
[52] U.S. Cl. ..................... 501/153; 501/127; 156/89
[58] Field of Search .................. 264/60, 61, 63, 264/65; 501/127, 153; 156/89

[56] References Cited

U.S. PATENT DOCUMENTS

| | | | |
|---|---|---|---|
| 3,698,923 | 10/1972 | Stetson et al. | 106/62 |
| 3,879,509 | 4/1975 | Elderbaum | 264/56 |
| 4,109,377 | 8/1978 | Blazick et al. | 29/626 |
| 4,340,436 | 7/1982 | Dubetsky et al. | 156/89 |
| 4,369,154 | 1/1983 | Dougherty | 264/63 |
| 4,678,762 | 7/1987 | Agarwal et al. | 501/127 |
| 5,085,720 | 2/1992 | Mikeska et al. | 56/89 |
| 5,130,067 | 7/1992 | Flatiz et al. | 264/60 |

OTHER PUBLICATIONS

Wolfe, G., "Technique Produces Ceramic Substrates With 0.002"/' Camber" Circuits Manuf. (USA), vol. 15, No. 10, 38, 40, 42, Oct. 1975. (Abstract Only).

*Primary Examiner*—David Brunsman
*Attorney, Agent, or Firm*—William C. Geary, III; Lahive & Cockfield

[57] ABSTRACT

A method of forming a ceramic having a smooth ceramic surface and an assembly for forming ceramics having a flat and smooth ceramic surface are disclosed. A greenware precursor is disposed between a greenware base and a greenware cover. A frame is disposed between the greenware base and greenware cover for limiting compression of the greenware article to an amount which allows formation of a smooth ceramic surface during densification of the greenware precursor. The greenware base, greenware cover and greenware precursor are densified to cause the greenware precursor to form a ceramic having a smooth ceramic surface.

1 Claim, 8 Drawing Sheets

METHOD FOR MAKING A SMOOTH-SURFACE CERAMIC

This is a continuation of application Ser. No. 07/696.570 filed on May 8, 1991 now U.S. Pat. No. 5,316,989.

BACKGROUND OF THE INVENTION

Ceramics are often used as substrates for electrical circuitry, such as high-density and thin-film electrical circuits. However, printing of circuits on ceramic substrate surfaces which are not sufficiently flat and smooth typically causes formation of gaps in such circuits. Gaps formed during printing of circuits on ceramic substrate surfaces often causes electronic components employing the printed circuits to fail.

Ceramic substrate surfaces formed during densification of greenware precursors generally are not sufficiently flat or smooth to allow printing of electrical circuitry thereon. Camber of ceramic substrate surfaces is removed and sufficient smoothness is achieved, typically, by treating the surface of densified ceramic substrates. Examples of common treatments include grinding, lapping and polishing. Also, ceramic substrates often must be ground on two opposing surfaces in order to form ceramic substrate surfaces which are sufficiently flat.

However, such treatments typically are time-consuming and limit the quality of electrical circuits printed on the treated ceramic surface because defects, such as cracks, pits and voids, form in the ceramic surface. Also, the surface of ceramic substrates can be contaminated with grinding fluids, lapping compounds or polishing compounds. Removal of contaminants from ceramic surfaces generally requires further processing. Often, trace amounts of contaminants can not be removed from the ceramic surfaces, thereby limiting yields of circuits employing such ceramic substrates.

Cracks, pits and voids in ceramic substrate surfaces can cause circuits printed on the surfaces to be defective or to fail during use. Also, resistance values of ceramic surfaces of substrates can be deleteriously affected by the presence of imperfections and contaminants left on ceramic surfaces which have been ground, lapped and polished. Printed electrical circuits which include short-circuits or open circuits caused by imperfections in the ceramic surface of the substrate must be discarded. A significant portion of yield losses of printed electrical circuits is caused by imperfections of ceramic surfaces of substrates on which electrical circuitry is printed.

Thus, a need exists for ceramics having flat and smooth ceramic surfaces which minimize or overcome the above-mentioned problems.

SUMMARY OF THE INVENTION

The present invention relates to a ceramic having a smooth ceramic surface. The invention also relates to a method of forming a ceramic having a smooth ceramic surface, and an assembly for forming a ceramic having a smooth ceramic surface.

A method of forming a ceramic having a smooth ceramic surface includes disposing a greenware precursor onto a greenware base which is sufficiently rigid to allow a greenware surface of the greenware article which is in intimate contact with said greenware base to form a smooth surface during densification of the greenware base and said greenware precursor. A greenware cover is disposed over the greenware precursor, whereby, during exposure of said base, cover and precursor to a sufficient temperature for a sufficient period of time to densify the greenware precursor and form a ceramic, the greenware surface of the greenware precursor is maintained in intimate contact with the greenware base, thereby causing the greenware precursor surface to form a smooth surface of the ceramic. The greenware base, cover and precursor are exposed to a sufficient temperature for a sufficient period of time to densify the greenware precursor and form the ceramic, thereby causing the greenware precursor to form a ceramic having a smooth surface.

A ceramic having a smooth surface is formed by a method including disposing a greenware precursor onto a greenware base which is sufficiently rigid to allow a greenware precursor surface in intimate contact with the greenware base to form a smooth surface during densification of said greenware precursor. A greenware cover is disposed over the greenware precursor, whereby, during exposure of the greenware base, cover and precursor to a sufficient temperature for a sufficient period of time to densify the greenware precursor and form a ceramic, the greenware surface of the greenware precursor is maintained in intimate contact with the greenware base for allowing the greenware surface to form a smooth surface. The greenware cover, base and precursor are exposed to a sufficient temperature for a sufficient period of time to densify the greenware precursor and form the ceramic, thereby causing the greenware precursor to form a ceramic having a smooth surface.

An assembly for forming a ceramic precursor having a smooth surface includes a greenware base which is sufficiently rigid to allow a greenware precursor to form a flat and smooth surface at a greenware precursor surface in intimate contact with the greenware base during densification of the greenware base and the greenware precursor. A greenware cover is disposed over the greenware precursor, whereby, during exposure of the greenware base, cover and precursor to sufficient heat for a sufficient period of time to densify the greenware precursor and form a ceramic precursor, the greenware precursor surface is maintained in intimate contact with the greenware base, thereby causing the greenware precursor surface to form a smooth surface of the ceramic.

This invention has many advantages. In general, ceramics can be formed which are suitable for piezoelectric, ferroelectric, magnetic, optical and superconductive applications. The ceramics formed can have surfaces which are sufficiently flat and smooth to allow significant reduction or elimination of further processing steps, such as diamond grinding, lapping and polishing. Further, ceramic surfaces can be formed which have fewer cracks, pits and voids, such as are caused by grinding, lapping and polishing steps. Also, contamination of ceramic surfaces by grinding fluids, lapping and polishing compounds is significantly reduced. Production yields of printed circuits and ceramic packages are thereby significantly increased.

DETAILED DESCRIPTION OF THE INVENTION

The features and other details of the invention will now be more particularly described with reference to the accompanying drawings and pointed out in the claims. The same number present is different drawings represents the same item. It will be understood that the particular embodiments of the invention are shown by way of illustration and not as limitations of the invention. The principle features of the invention may be employed in various embodiments without departing from the scope of the invention.

Figure 1:
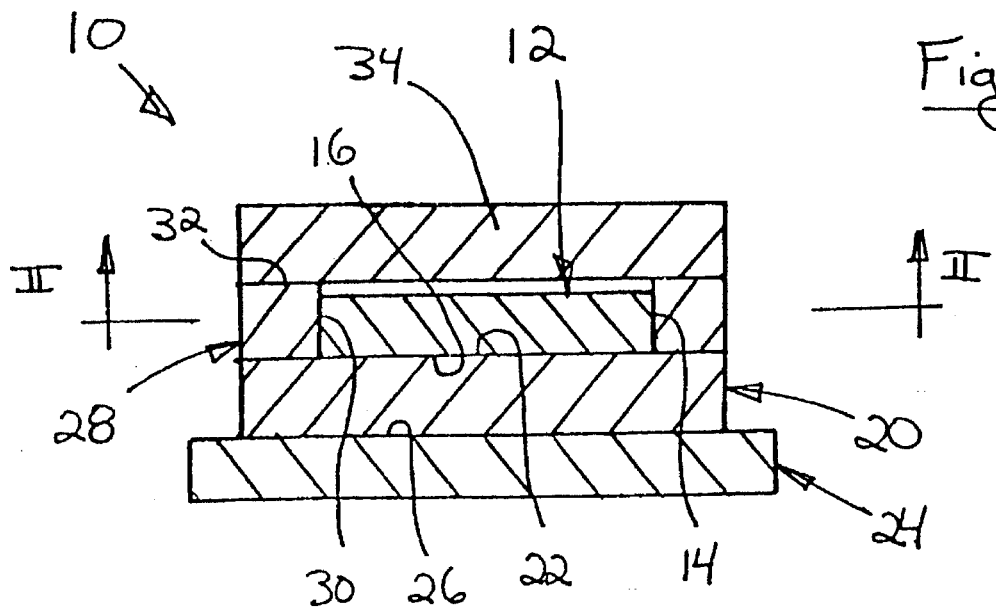
FIG. 1 is a section view of one embodiment of an assembly of the invention.

One embodiment of the invention is illustrated in FIG. 1. Assembly 10 includes a greenware precursor 12 having an outside edge 14, a first precursor surface 16 and a second precursor surface 18. The greenware composition of greenware precursor 12 includes a suitable ceramic powder. Examples of suitable ceramic powders include alumina ($Al_2O_3$) and beryllia powder, having a surface area in the range between about twelve $m^2/gm$ and about fifteen $m^2/gm$. However, other ceramic powders which are suitable for forming ceramics can be used.

In a preferred embodiment, greenware precursor 12 has a high alumina or high beryllia concentration. The terms "high alumina" and "high beryllia," as those terms are used herein, means an amount of alumina or beryllia in greenware precursor 12 which will allow formation of a ceramic having an alumina or beryllia concentration of greater than about 99% by weight.

In a particularly preferred embodiment, Alcoa A-16 alumina is employed. The alumina is combined with a suitable grinding media. An example of a suitable grinding media is cylindrical borundrum having a particle diameter of about 13/16 inches. Other examples include materials which also operate as sintering aids, such as thorium oxide and europium oxide. In a preferred embodiment, the grinding media comprises about 70% of the amount of combined alumina and grinding media.

The alumina powder and grinding media can be combined in a suitable mill, such as is known in the art. An example of a suitable mill is a ball mill having straight sides, such as a hexagonal or pentagonal ball mill. Preferably, the ball mill is a size two borundum fortified mill.

A suitable liquid carrier is combined with the alumina and grinding media in the mill. Preferably, the amount of liquid carrier is about 45% of the total weight of the alumina and liquid carrier. Examples of suitable liquid carriers include organic solvents such as trichloroethylene.

A deflocculant is added to the alumina and liquid carrier in an amount sufficient to prevent agglomeration during the milling. Examples of suitable deflocculants include, for example: fatty acids; synthetic surfactants, such as benzene sulfonic acids; natural fish oils; etc. A preferred deflocculant is Ensign Z-3 menhaden oil, commercially distributed by Haynie Products, Inc. The amount of oil added to the combined alumina and liquid carrier is in the range, for example, of between about 1.5 weight percent and about two weight percent of the amount of alumina present in the mixture of alumina and liquid carrier. The deflocculant can be intermittently combined with the combined alumina and liquid carrier in small increments during milling of the alumina and the liquid carrier, in order to minimize the likelihood of forming agglomerates of alumina.

Grain-growth inhibitors can be added to the alumina to allow greater variability of firing times during densification to form the desired ceramic. Examples of suitable grain-growth inhibitors are well-known in the ceramic industries and include magnesium oxide, nickel oxide, clays, talc, etc. A preferred amount of grain-growth inhibitor is about 0.5 weight percent of the alumina.

In one embodiment, the wet mixture and grinding media are milled for a period of time in the range of between about 100 hours and about 250 hours. The wet mixture is milled until the alumina has a surface area of at least fifteen $m^2/gm$. In a preferred embodiment, the wet mixture is milled for a period of a time of about 120 hours.

The binder is added to the wet mixture in the ball mill in an amount sufficient to bind the powder mixture during formation of the greenware article. Other examples of binders include: A-cycloid B-7 binder, commercially manufactured by Rohm and Haas Co.; polyvinyl buteryl resin; polymethyl methylacrylic resin, cellulose acetate buteryl resin; etc.

A plasticizer can be added to the wet mixture in an amount sufficient to cause the greenware article formed to exhibit sufficient flexibility to prevent fracture during densification to form a ceramic. Examples of suitable plasticizers include cyclohexanone and glycols such as UCN 2000 plasticizer, manufactured by Union Carbide Corporation. The preferred amount of plasticizer in the wet mixture is less than about two weight percent.

A binder can be combined with the powder mixture for binding of the powder mixture during formation of greenware precursor 12. Examples of suitable binders include Cimarec binder, etc. The binder can be mixed with a suitable solvent to form a binder solution which is then combined with the powder mixture. Examples of suitable solvents include ethanol, trichloroethane, etc. It is to be understood however that more than a single binder or solvent can be employed to form the binder solution. Preferably the amount of binder in the binder solution is in the range of between about three percent by weight of binder solution and about ten percent by weight of binder solution.

The binder can be combined with the wet mixture before or during milling. In one illustration, about 30% of the binder to be added to the wet mixture is combined with the wet mixture prior to milling. The wet mixture is then ball-milled for about 60 hours, after which the remaining 70% of the binder to be added is combined with the wet mixture in the ball mill. The wet mixture is then ball-milled for an additional sixty hours. In another preferred embodiment, all of the binder to be combined with the wet mixture is added to the wet mixture in the ball mill before ball-milling.

The wet mixture is ball-milled to form a milled slurry. The milled slurry is directed from the ball mill through a screen having a suitable mesh for forming the milled slurry into a slurry having substantially uniform consistency. An example of a suitable mesh size is a 400 mesh screen. The screen is formed of a suitable material, such as polypropylene, copper, nylon, brass, 316L stainless steel, etc.

The milled slurry can be formed into a greenware article by a suitable method, such as is known in the art. In one embodiment, the milled slurry is poured retainer comprising plastic. An example of a suitable retainer is a retainer comprising a plastic, etc. The retainer is sufficiently rigid to contain the milled slurry and to cast the milled slurry in a suitable shape to conditions sufficient to form the milled slurry into a greenware precursor. In a preferred embodiment, the milled slurry is covered by a suitable solid cover plate comprised of a suitable material, such as glass. The covered milled slurry is then allowed to settle. In a particularly preferred embodiment, the milled slurry is allowed to settle for a period of time of about twelve hours.

Although the exact mechanism is not completely understood, it is believed that settling of the milled slurry causes large particles to settle to the bottom of the retainer and causes relatively fine particles in the milled slurry to be preferentially distributed at the top of the retainer. The glass cover protects the milled slurry from contamination by dust during the settling period. Settling of the milled slurry enables the greenware precursor formed from the milled slurry to have a greater proportion of relatively coarse particles at one surface of the greenware precursor, and a higher proportion of relatively fine particles at an opposite side of the the greenware precursor. A ceramic formed from a greenware precursor can thereby have a surface comprising a higher proportion of relatively fine particles as compared to a ceramic surface of a ceramic formed from a greenware precursor having the same composition, but having a substantially uniform distribution of particle sizes.

Following a suitable period of settling, the glass cover over the slurry is replaced with a porous cover. The porous cover protects the slurry from contamination by dust, but allows solvents in the slurry to evaporate and to pass through the porous cover.

The milled slurry is exposed to conditions sufficient to volatilize the solvent in the milled slurry in an amount sufficient to form the milled slurry into a greenware precursor suitable for densification to form a ceramic. The atmosphere to which the slurry is exposed during volatilization of solvent in the slurry can be air, nitrogen, or some other suitable gas. The greenware is then removed from the retainer and can be suitably cut by a method, such as is well-known in the art, to form greenware precursor 12.

In another embodiment, the milled slurry is poured in through a series of retainers linked by conduits. Sedimentation of coarse particles within each retainer causes only milled slurry containing relatively fine particles to pass to the next retainer within the series. Milled slurries thereby collect within retainers which contain only relatively fine particles, allowing formation of ceramic articles having smoother surfaces. Alternatively, removal of coarse particles and retention of relatively fine particles within the milled slurry can be obtained by methods well known in the art, such as use of a sedimentation cone, centrifuge or other filtration techniques known in the art.

Greenware precursor 12 can be scored for later separation of fragments of the ceramic formed from greenware precursor 12, or for forming circuit patterns, etc. Examples of suitable methods of scoring greenware precursor 12 include mechanical scoring, photographic etching, chemical etching, lasers, and other methods of scoring greenware precursor 12 which are well known in the art.

Greenware precursor 12 is disposed on greenware base 20. Greenware base 20 includes upper surface 22 and is disposed on support 24. Greenware base 20 is formed of a greenware composition which is substantially the same as the greenware composition of greenware precursor 12.

Support 24 is sufficiently flat and rigid to allow upper surface 22 to remain flat during densification of greenware base 20 and greenware precursor 12. Support 24 is formed of a suitable material for supporting greenware base 20 during densification. Examples of suitable materials include glass, metal, etc. In a preferred embodiment, surface 26 of support 24 is treated by depositing a suitable material onto surface 26 for allowing greenware base 20 to shrink substantially uniformly during densification. A suitable fluid can be disposed on upper surface 22 and between upper surface 22 and first precursor surface 16 for allowing disassembly of assembly 10 following densification.

Greenware frame 28 is then disposed on upper surface 22 of greenware base 20. Greenware frame 28 is formed of substantially the same greenware composition as that of greenware precursor 12. Preferably, greenware frame 28 abuts greenware precursor 12 whereby inside edge 30 of greenware frame 28 abuts outside edge 14 of greenware precursor 12. In a particularly preferred embodiment, a suitable fluid, such as the dilute milled slurry described above, is disposed between inside edge 30 and outside edge 14 for forming a bond between greenware frame 28 and greenware precursor 12, whereby contiguous contact is maintained between greenware frame 28 and the greenware precursor 12 at inside edge 30 and outside edge 14 during densification of greenware precursor 12 to form a ceramic.

Raised surface 32 of greenware frame 28 is raised above greenware precursor 12 in an amount sufficient to support greenware cover 34 above greenware precursor 12. Greenware frame 28 is sufficiently thick to limit compression of greenware precursor 12 between greenware base 20 and greenware cover 34 to an amount which allows greenware precursor 12 to shrink during densification without significant distortion.

Greenware cover 34 is formed of a greenware composition having substantially the same composition as greenware precursor 12 was formed. A suitable fluid, such as a dilute, milled slurry, is disposed over raised surface 32 and second precursor surface 18 of greenware precursor 12. Greenware cover 34 is then disposed onto raised surface 32 and over greenware precursor 12.

Figure 2:
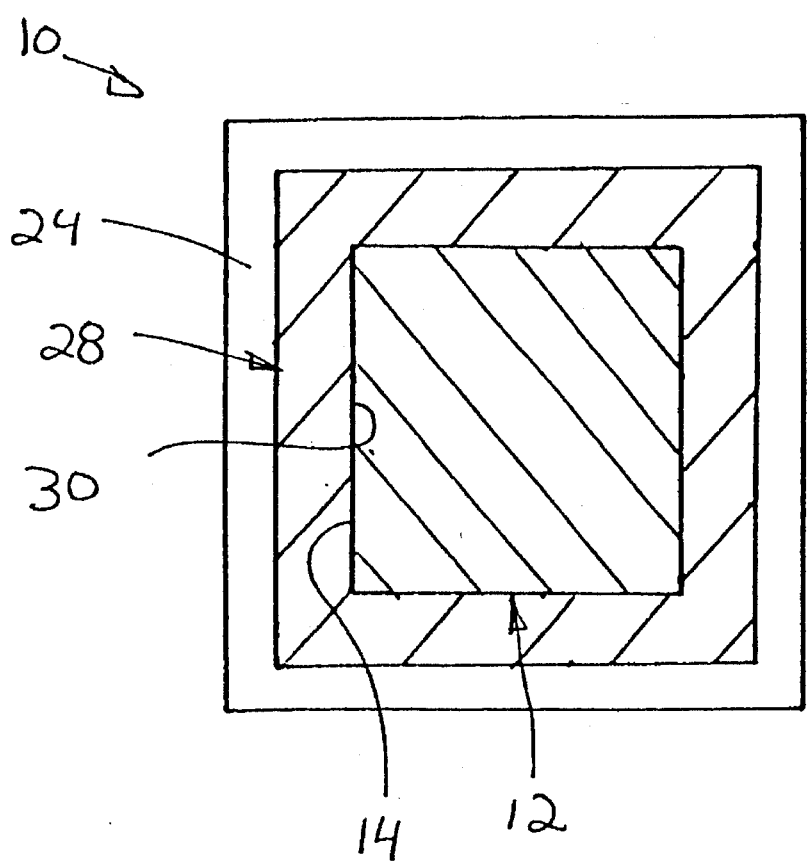
FIG. 2 is a plan view of the embodiment illustrated in FIG. 1 taken along line II—II.

FIG. 2 is a section view of assembly 10 taken along line II—II of FIG. 1. As can be seen in FIG. 2, inside edge 30 of greenware frame 28 complements outside edge 14 of greenware precursor 12. A suitable fluid, such as a dilute milled slurry, which is disposed between outside edge 14 of greenware precursor 12 and inside edge 30 of greenware frame 28, causes greenware frame 28 to restrain movement of outside edge 14 resulting from irregular distribution of forces on greenware precursor 12 caused by densification of greenware precursor 12.

Figure 3:
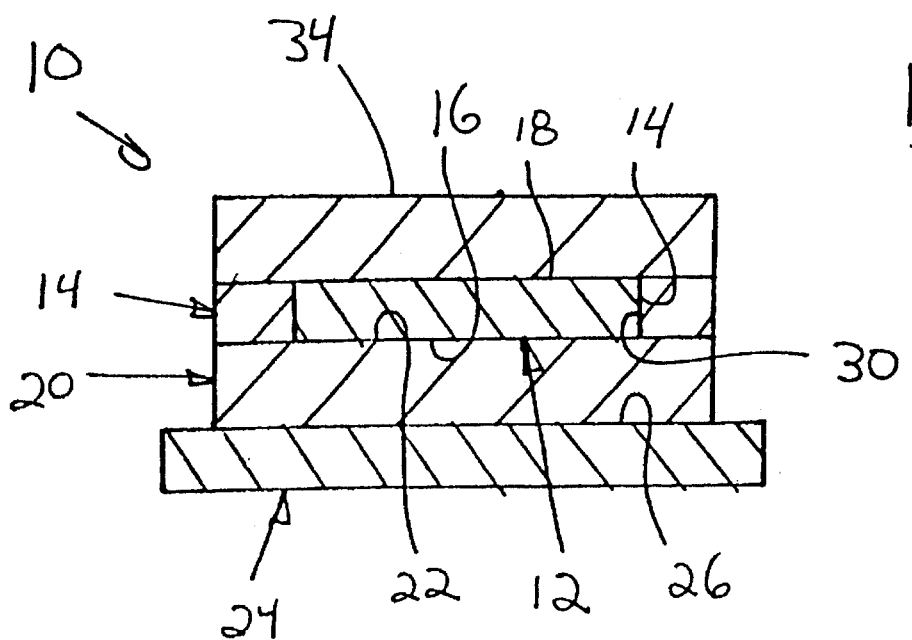
FIG. 3 is a section view of the embodiment illustrated in FIG. 1 following compression.

As illustrated in FIG. 3, assembly 10 is then compressed by pressing support 24 and greenware cover together using a suitable press until outside edge 14 and inside edge 30 are in contiguous contact and second precursor surface 18 of greenware precursor 12 is in intimate contact with greenware cover 34. In a preferred embodiment, a pressure of about two thousand pounds per square inch is applied for about one minute at a temperature of about 100° F. Assembly 10 is then heated in a suitable oven to volatilize essentially all moisture within greenware base 20, greenware precursor 12, greenware frame 28 and greenware cover 34. After volatilization of water, the temperature of assembly 10 is raised to a temperature sufficient to volatilize and remove essentially all remaining volatile solvents from assembly 10. For example, the temperature of assembly 10 is raised to a temperature in the range of between about 600° F. and about 800° F. for a period of time in the range of between about two hours and about three hours.

After volatilization of solvents, the temperature of assembly 10 is raised to a temperature sufficient to densify greenware precursor 12 and thereby form a ceramic. In one embodiment, assembly 10 is exposed to a temperature during densification in the range of between about 1400° C. and about 1800° C. for a period of time in the range between about fifteen minutes and about three hours. In a particularly preferred embodiment, the assembly is exposed to a temperature of about 1550° C. at about atmospheric pressure for a period of time of about six hours.

During densification, first precursor surface 16 of greenware precursor 12 forms a flat and smooth ceramic surface. "Smooth ceramic surface," as that term is used herein, means a ceramic surface, having a CLA surface smoothness of less than one microinch, exhibiting no irregularities greater than about one microinch across the ceramic surface. In a particularly preferred embodiment, both first precursor surface 16 contacting the upper surface 22 and second precursor surface 18 form flat and smooth ceramic surfaces during densification.

It is to be understood that, alternatively, first precursor surface 16 and second surface 18 of greenware precursor 12 and consequently, first and second flat and smooth ceramic surfaces of the ceramic article formed from greenware precursor 12 article can, if desired, have a camber imparted by a camber of upper surface 22 of greenware base 20, by greenware cover 34, support 24 or by greenware cover 34. The resulting ceramic surface can, thereby, have a variety of shapes which do not vary from the surface shape of the support, greenware base or cover by more than than about one microinch.

Figure 4:
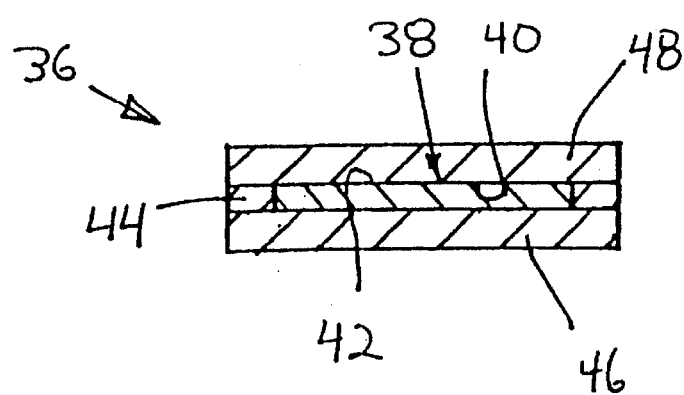
FIG. 4 is a section view of the assembly illustrated in FIG. 3 following densification.

Assembly 10 is then cooled to form ceramic assembly 36, illustrated in FIG. 4. Ceramic assembly 36 includes ceramic 38 which has a first flat and smooth ceramic surface 40 and a second flat and smooth ceramic surface 42. Ceramic 38 is disposed within frame 44 between ceramic base 46 and ceramic cover 48. Ceramic assembly 36 is then disassembled to remove ceramic 38, having first flat and smooth ceramic surface 40 and second flat and smooth ceramic surface 42 from ceramic assembly 36.

Figure 5:
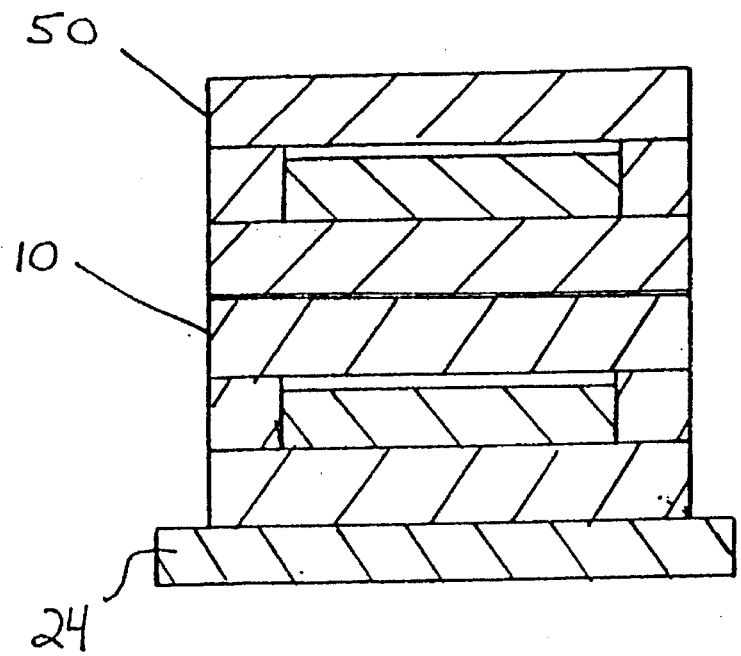
FIG. 5 is a section view of another embodiment of the invention, wherein a plurality of assemblies illustrated in FIG. 1 are stacked.

As illustrated in FIG. 5, assembly 40, identical to assembly 10, shown in FIG. 1, but without an additional support 24, can be stacked onto assembly 10. Additional assemblies can be stacked on assembly 50 for forming a unit which is jointly compressed, thereby allowing mass production of ceramics having flat and smooth ceramic surfaces.

Figure 6:
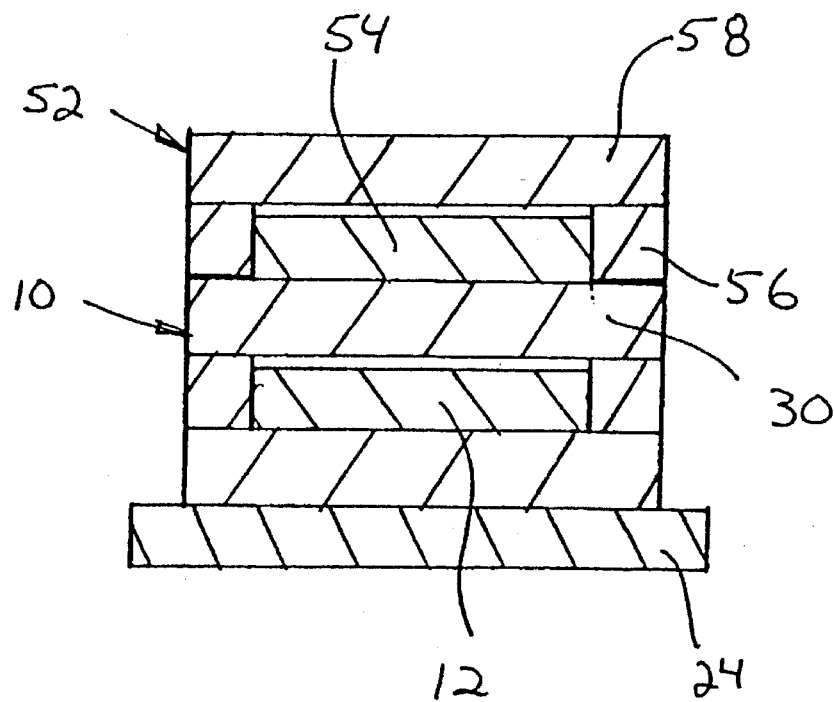
FIG. 6 is a section view of still another embodiment of the invention, wherein a cover of the lower assembly is also a base of an upper assembly.

In another illustration of the invention, shown in FIG. 6, second assembly 52 includes second greenware precursor 54, second frame 56 and second cover 58. Second greenware precursor 54 and second frame 56 are disposed on greenware cover 30 of assembly 10. Second frame 56 is disposed on greenware cover 30. Second frame 56 is identical to greenware frame 24. Second cover 58 is disposed onto second frame 56 over second greenware precursor 54. Assembly 10 and second assembly 52 are then compressed and densified to cause greenware precursor 12 and second greenware precursor 54 to form a plurality of ceramics having flat and smooth surfaces.

Figure 7:
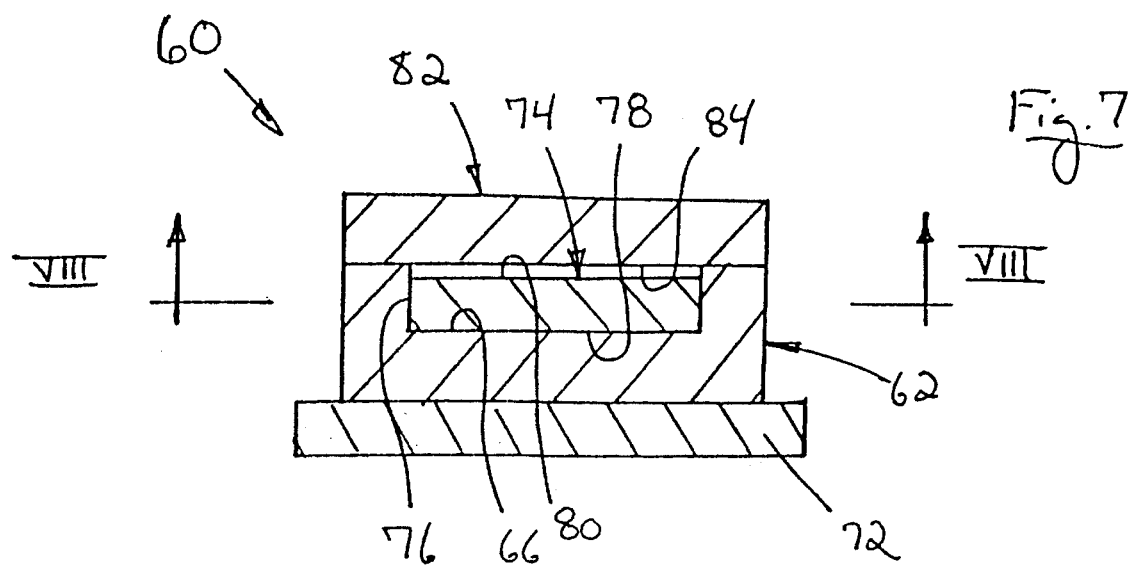
FIG. 7 is a section view of a further embodiment of the invention, wherein a greenware precursor is disposed in a recessed portion of a greenware base.

In another illustration of the invention, shown in FIG. 7, assembly 60 includes greenware base 62 disposed on support 64. Inside lip 68 extends about the perimeter of recessed surface 66. Raised surface 70 extends about the perimeter of recessed portion 64. Greenware base 62 is disposed on support 72. Support 72 is formed of a suitable material, such as glass, etc.

Greenware precursor 74 is disposed on recessed surface 66. Outside edge 76 of greenware precursor 74 is adjacent inside lip 68. A suitable fluid, such as diluted milled slurry, is disposed between inside lip 68 and outside edge 76 for providing contiguous contact between greenware base 62 and greenware precursor 74 during densification. First precursor surface 78 is in intimate contact with recessed surface 66. Second precursor surface 80 of greenware precursor 74 is substantially parallel to first precursor surface 78. Greenware cover 82 is disposed on raised surface 70 and covers greenware precursor 74. A suitable fluid, such as a dilute milled slurry, can be disposed between raised surface 60 and greenware cover 82 for allowing release between the greenware base 62 and greenware cover 82 following densification. Raised surface 70 is sufficiently raised above second precursor surface to support a cover over greenware precursor 74.

Assembly 60 is then compressed by a suitable means to cause greenware precursor 74 to be compressed between recessed surface 66 and inside surface 84 of greenware cover 82. Recessed surface 66 and inside surface 84 are sufficiently flat and smooth during compression of assembly 60 to cause first precursor surface 78 and second precursor surface 80 of greenware precursor 74 to form flat and smooth ceramic surfaces during densification of greenware precursor 74.

Figure 8:
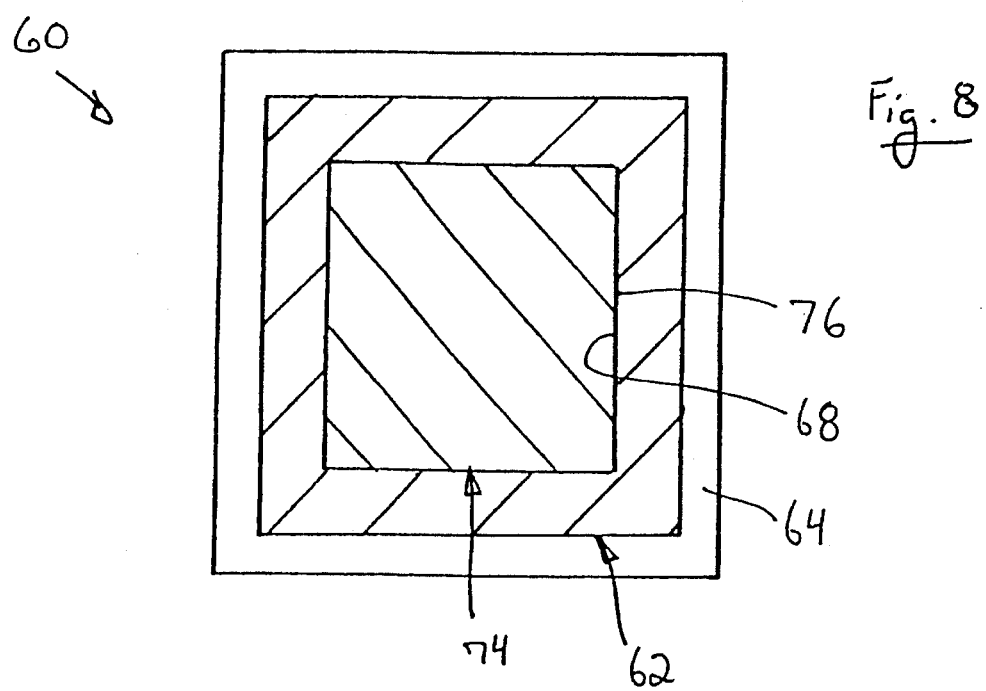
FIG. 8 is a plan view of the embodiment illustrated in FIG. 7 taken along line VIII—VIII.

FIG. 8 is a section view of assembly taken along line VIII—VIII of FIG. 7. As can be seen from FIG. 7, inside lip 68 of greenware base 62 substantially complements outside edge 76 of greenware precursor 74. A suitable fluid, such as a dilute milled slurry, is disposed between greenware base 62 and greenware precursor 74 causes greenware base 62 to restrain movement of outside edge 76 and consequent distortion resulting from irregular distributions of forces on greenware precursor 74 caused by densification.

Figure 9:
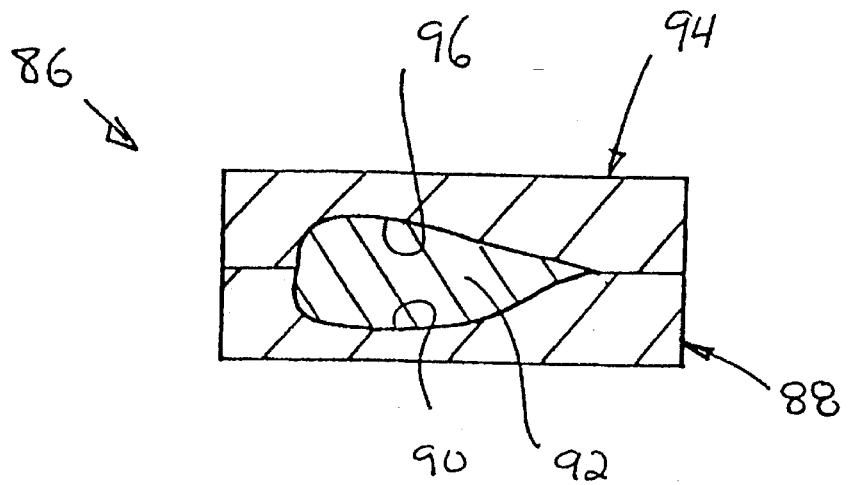
FIG. 9 is a section view of an embodiment of the invention, wherein a contoured greenware precursor is disposed within a greenware base and cover which have recessed portions contoured to complement the greenware precursor.

It is also to be understood that a recessed portion of greenware base can have several different possible configurations. For example, as can be seen in FIG. 9, assembly 86 includes greenware base 88 which defines a recessed surface 90 that is shaped to conform to contoured greenware precursor 92. Greenware cover 94 has recessed surface 96 which is also contoured to conform to the shape of greenware precursor 92. Surfaces of the ceramic formed by densification of greenware precursor 92 are smooth and conform to the shape of the ceramic base and cover formed by densification of greenware base 88 and greenware cover 94.

Figure 10:
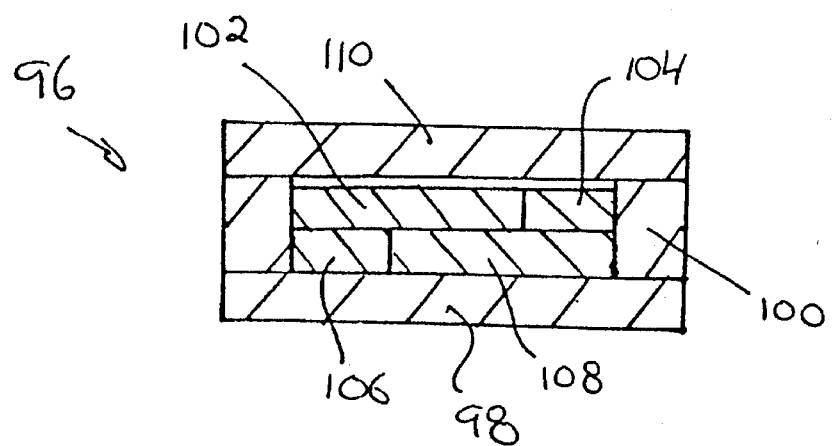
FIG. 10 is a section view of an additional embodiment of the invention, wherein several greenware precursors are layered within a single greenware frame.

In another embodiment of the invention, shown in FIG. 10, assembly 96 includes greenware base 98 and greenware frame 100 disposed on greenware base 98. Several greenware precursors 102,104,106,108 are layered on greenware base 98 and within greenware frame 100. Greenware cover 110 is disposed on greenware frame 100 and covers greenware precursors 102,104,106,108. Assembly 96 can then be compressed and densified to cause greenware precursors 102,104,106,108 to form ceramics having flat and smooth ceramic surfaces.

Figure 11:
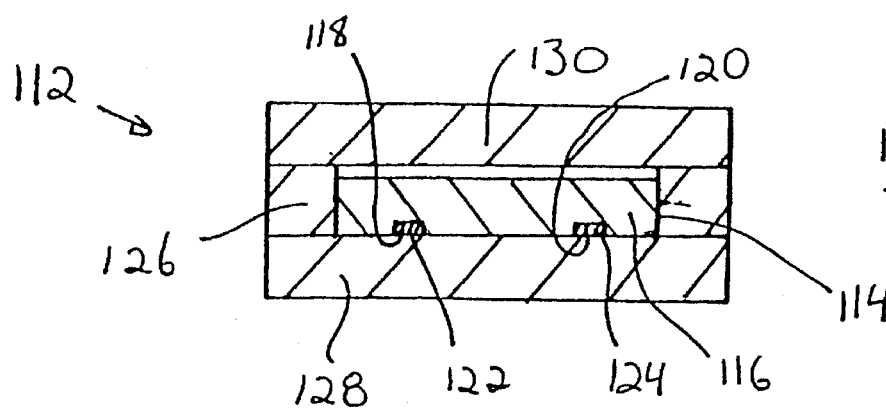
FIG. 11 is a section view of another embodiment of the invention, wherein greenware inlays are disposed in recessed portions of a greenware precursor.

Another illustration of the invention is shown in FIG. 11. Assembly 112 includes greenware precursor 114 having greenware precursor surface 116. Recessed portions 118,120 of greenware precursor 114 are disposed at greenware precursor surface 116. Greenware inlays 122,124 are disposed within recessed portion 118,120 respectively. Greenware precursor surface 116 and greenware frame 126 are disposed on greenware base 128. Cover 130 is disposed on greenware frame 126 and over greenware precursor 114. Assembly 112 can be densified and ceramic inlays formed from greenware inlays 122,124 can be removed from recessed portions of the ceramic formed by densification of assembly 112. The depth of the recessed portions of the ceramic is less than about one microinch.

Figure 12:
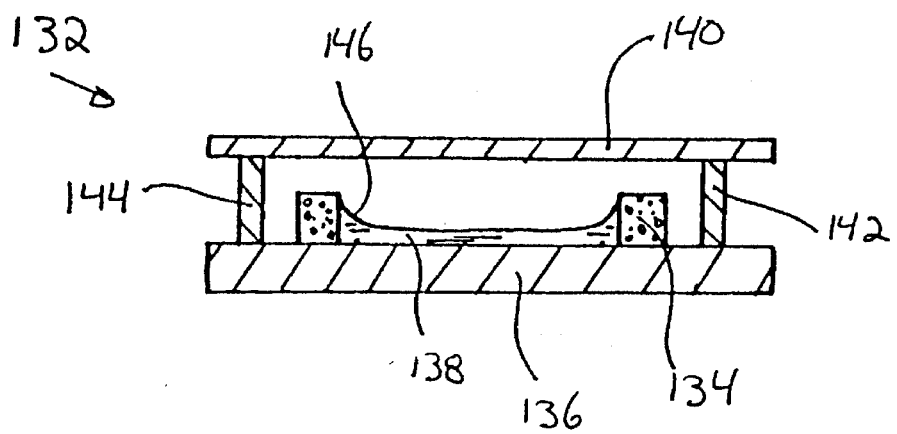
FIG. 12 is a section view of an embodiment of the invention, wherein a milled slurry is disposed within a porous frame.

Still another illustration of the invention is shown in FIG. 12. Assembly 132 includes porous frame 134 disposed on plate 136. Porous frame 134 is formed of a suitable material for infiltration of a milled slurry. Plate 136 is formed of a suitable material for supporting a milled slurry during formation of a greenware precursor from the milled slurry.

Plate 136 can be coated with a suitable release agent for allowing separation of a greenware precursor from plate 136. Examples of suitable release agents include silicone-treated release paper, dimethylchlorosilane, etc. Milled slurry 138 is poured onto plate 136 and within porous frame 134. Cover 140 is placed on top of spacers 142,144 for supporting cover 138 above porous frame 134. An additional assembly can be disposed on cover 140 for mass production of greenware precursors.

Milled slurry adjacent porous frame 134 at least partially infiltrates pores of porous frame 134. Infiltration of the milled slurry into porous frame 134 causes formation of concave meniscus 146 at the perimeter of milled slurry 138. A substantial portion of volatiles in milled slurry 138, such as water and other solvents, are then volatilized by a suitable method to cause milled slurry 138 to form a greenware material having a concave perimeter. The greenware material is then separated from porous frame 134 by a suitable method, such as by cutting, to form a greenware precursor having a concave perimeter.

Figure 13:
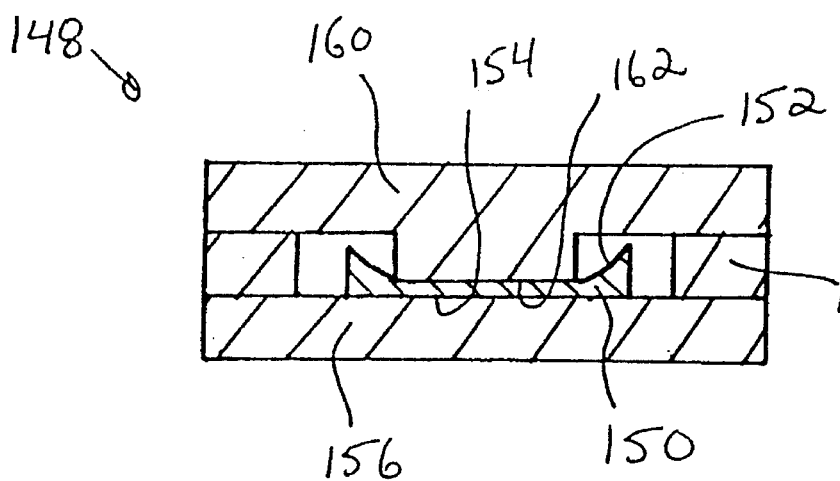
FIG. 13 is a section view of an embodiment of the invention, wherein a greenware precursor formed by a method of the invention illustrated in FIG. 12 is disposed in a greenware assembly.

Assembly 148 includes greenware precursor 150, having concave perimeter 152 and a precursor surface 154. Greenware precursor 150 is disposed on greenware base 156, as illustrated in FIG. 13. Greenware frame 158 is also disposed on greenware base 156 and surrounds greenware precursor 150. Greenware cover 160 is disposed on greenware frame 158 and has an interior surface 162 which rests on greenware precursor 150.

Greenware precursor 150 is then compressed between greenware base 156 and greenware cover 160 by a suitable compression means, and then densified to thereby cause greenware precursor 150 to form a ceramic material. Concave perimeter 152 and compression between interior surface 162 and greenware base 156 causes intimate contact to be maintained between precursor surface 154 and greenware base 156 during densification, thereby preventing significant distortion of precursor surface 154. Precursor surface 154 thus forms a ceramic surface during densification which is flat and smooth. Following densification, the concave perimeter of the resulting ceramic material dan then be removed, thereby forming a ceramic having a flat and smooth ceramic surface.

Figure 14:
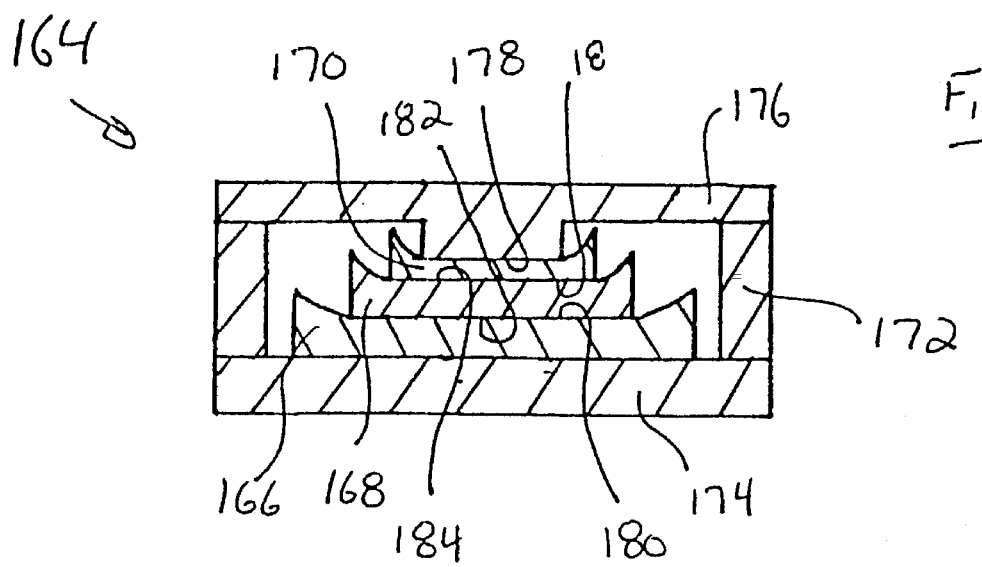
FIG. 14 is a section view of an embodiment of the invention, wherein a plurality of greenware precursors formed by the method illustrated in FIG. 12 are stacked within a greenware assembly.

As illustrated in FIG. 14, assembly 164 includes a plurality of greenware precursors 166,168,170, each having a concave perimeter. Greenware precursors 166,168,170 are stacked between within greenware frame 172 and between greenware base 174 and greenware cover 176. Greenware precursors 166,168,170 are compressed between greenware base 174 and interior surface 178 of greenware cover 176. Upper surface 180 of greenware precursor 166 is sufficiently flat to allow precursor surface 182 of greenware precursor 168 to form a flat and smooth ceramic surface during densification of greenware precursors 166,168,170. Likewise, upper surface 184 of greenware precursor 168 is sufficiently flat and smooth to allow precursor surface 186 of greenware precursor 170 to form a flat and smooth ceramic surface during densification. Concave perimeters of the resulting ceramic materials are then removed to form a plurality of ceramics having flat and smooth surfaces.

Figure 15:
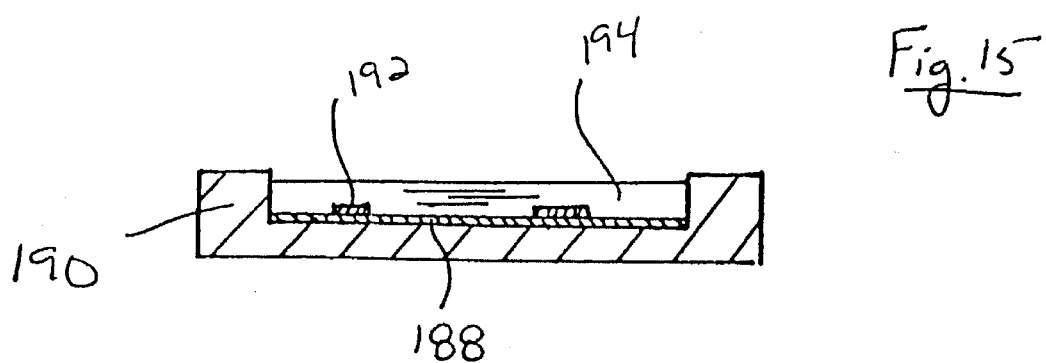
FIG. 15 is a section view of a method of the invention, wherein a milled slurry is disposed in a frame and over a metal mask.
Figure 16:
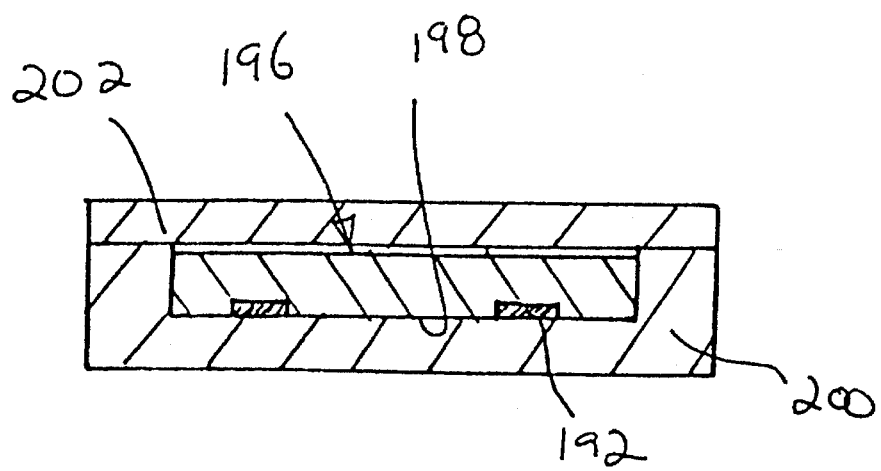
FIG. 16 is a section view of an embodiment of the invention, wherein a greenware precursor formed from the milled slurry illustrated in FIG. 15 and including the metal mask is disposed in a greenware assembly.

Another illustration of the invention is shown in FIG. 15. Double-sided sticky tape 188 is disposed in glass retainer 190. Metal mask 192, which can be in the form of an electrical circuit, is deposited on double-sided sticky tape 188, by a suitable method, such as is known in the art. Milled slurry 192 is poured onto metal mask 192 and then exposed to a sufficient temperature to volatilize a substantial portion of volatiles within milled slurry 192, thereby forming a greenware precursor 196, illustrated in FIG. 16.

Greenware precursor 196, having a precursor surface 198 in which metal mask 192 is inlaid, is removed from the glass retainer and disposed in greenware base 200. Metal mask 192 is disposed between greenware precursor 196 and greenware base 200. Greenware precursor 196 is compressed between greenware base 200 and greenware cover 202, and then densified. Densification of greenware precursor 196 causes precursor surface 198 to form a flat and smooth ceramic surface in which metal mask 192 is inlaid. The thin metal mask comprises lines of metal having a thickness of about two thousandths of an inch and a width of about one thousandth of an inch.

Figure 17:
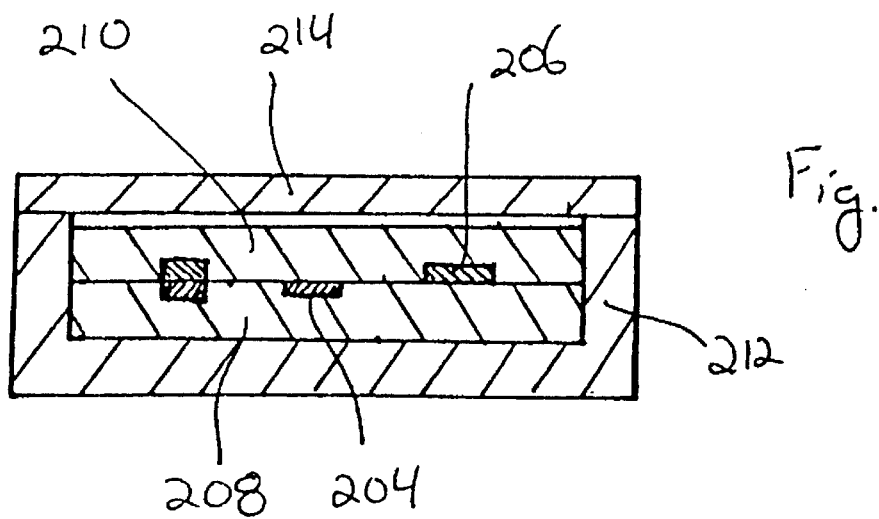
FIG. 17 is a section view of an embodiment of the invention, wherein a plurality of greenware precursors formed from the milled slurry illustrated in FIG. 15 are stacked in a greenware assembly for forming a multilayered ceramic printed circuit.

As can be seen in FIG. 17, metal patterns 204,206 can be formed in layers by stacking greenware precursors 208,210 between greenware base 212 and greenware cover 214. Greenware precursors 208,210 are compressed between greenware base 212 and greenware cover 214 to form a multilayered ceramic in which metal patterns 204,206 are disposed.

A multilayer metallized ceramic can be formed by layering greenware surfaces which have been metallized. The layered metallization of the greenware surfaces can form patterns, such as electrical circuits, for example. Metallized greenware can also be scored for fracture and layering after densification to form electrical circuits. The risk of causing defects during densification which will result in short-circuiting between the metallized surfaces of the resulting layered ceramic substrates is thereby substantially reduced.

Alternatively, the mask formed on the greenware article can be formed of a material which is readily decomposed during densification, thereby causing formation of a score on the ceramic article formed during densification.

The invention will now be further and specifically described by the following examples. All parts and percentages are by weight unless otherwise stated.

Exemplification

A mixture was formed which included:26.6 grams of 622 Alumina Columed Superground A-16 aluminum oxide, commercially available from Alcoa 0.5 grams ball clay, commercially available from Pioneer Company; 0.5 grams of talc; 21.9 grams of B-7 Acryloid, commercially available from Rohm and Haas Company; 0.5 grams of resin, 5.1 gram of zylol; 3.2 grams of anydrous alcohol; and 62.6 grams of acetone.

The mixture was combined with milling media in a hexagonal mill jar. The mixture was then ball milled for a period of 120 hours in the mill jar by rotating the mill jar at a rate of twenty revolutions per minute to form a wet slurry.

A film of Product No. 27220-3 dimethyl dichlorosilane, commercially available from PCR, Inc. was formed on a glass plate. A porous sponge rubber frame was disposed on the film. The frame was a square formed of four identical porous sponge rubber strips.

A portion of the milled slurry was poured from the mill jar through a strainer into a frame disposed on a glass plate. Each strip was ⅜ inches high, ⅜ inches wide and seven inches long. The amount of milled slurry poured into the frame was sufficient to allow a portion of the milled slurry to partially infiltrate the pores of the frame around the inside of the frame.

A porous cover was then disposed on top of the frame. The glass plate, the milled slurry, the frame and the porous cover were then heated to volatilize the water and other volatile components of the milled slurry. The milled slurry was thereby formed into a greenware material. The frame was then cut away from the greenware material to form a greenware precursor having a concave perimeter.

A greenware base was formed by pouring a milled slurry, formed by the same method described above for the greenware precursor, into a mold. The milled slurry was then exposed to conditions sufficient to cause the milled slurry to form greenware material. The greenware material was then removed from the mold and cut to form the greenware base. A surface of the greenware material in the mold was used as the upper surface of the greenware base. The greenware base was then disposed on a support. A film of dilute slurry, formed of milled slurry diluted with water, was disposed on the greenware. A greenware frame was disposed on the greenware base. The greenware precursor was disposed in the greenware frame and on the greenware base.

A greenware cover was disposed on the greenware frame. The assembly, including the support, greenware base, greenware frame, greenware precursor and greenware cover, were then compressed. While under compression, the assembly was densified. The greenware precursor was thereby formed into a ceramic having a flat and smooth surface where the greenware precursor abutted the greenware base.

The assembly was disassembled and the flat and smooth surface of the ceramic was measured. The roughness of the flat and smooth surface was less than one micron.

Equivalents

Those skilled in the art will recognize or be able to ascertain, using no more than routine experimentation, many equivalents to the specific embodiments of the invention described specifically herein. Such equivalents are intended to be encompassed in the scope of the following claims.

I claim:

1. A thin, flat poured or slip-east as fired substrate comprising at least 99% of densely packed inorganic grains of ceramic forming powder of alumina or berrylia and the balance comprising equal amounts of ball clay and talc, the ceramic being characterized by zero water absorption and CLA surface smoothness of less than 1 microinch on at least one major surface of the ceramic, and a flatness of less than 0.00 inch per inch camber.

* * * * *